United States Patent [19]

Cole

[11] Patent Number: 4,768,764

[45] Date of Patent: Sep. 6, 1988

[54] GREEN TIRE HOLDER

[76] Inventor: John R. Cole, 1033 Top Of The Hill Dr., Akron, Ohio 44313

[21] Appl. No.: 861,846

[22] Filed: May 12, 1986

[51] Int. Cl.[4] ............................................... B25B 5/14
[52] U.S. Cl. ..................................... 269/118; 269/221
[58] Field of Search ............... 269/111, 118, 221, 240, 269/114, 172; 211/23, 24

[56] References Cited

U.S. PATENT DOCUMENTS

| | | | |
|---|---|---|---|
| 500,364 | 6/1893 | Baker | 269/221 |
| 979,305 | 12/1910 | Hunt | 269/172 |
| 1,000,725 | 8/1911 | Duus | 269/118 |
| 2,460,679 | 2/1949 | Clay | 269/118 |
| 3,393,807 | 7/1968 | Sylvester et al. | 211/24 |
| 4,238,951 | 12/1980 | Grainger et al. | 269/114 |

Primary Examiner—Frederick R. Schmidt
Assistant Examiner—Judy J. Hartman
Attorney, Agent, or Firm—Oldham & Oldham

[57] ABSTRACT

The green tire holder disclosed herein comprises a vertical shaft having a plurality of uniformly spaced apart arms extending outwardly therefrom, a slidable shoe mounted on each of said arms for engaging a bead of a green tire and a slidable tread support mechanism mounted on each arm near the outer end thereof. The tire holder includes means for moving all of the shoes simultaneously toward or away from the center by equal amounts, so that the shoes at all times are equidistant from the center. Each tread support mechanism includes, a tiltable support plate, preferably flat, which engages the tread portion of the green tire, and a support arm for supporting the plate. The tread support mechanisms are slidable independently of the shoes. The angle of inclination of the tread support plates may be varied, e.g. from 0° to 60° to the horizontal at 15° intervals.

8 Claims, 4 Drawing Sheets

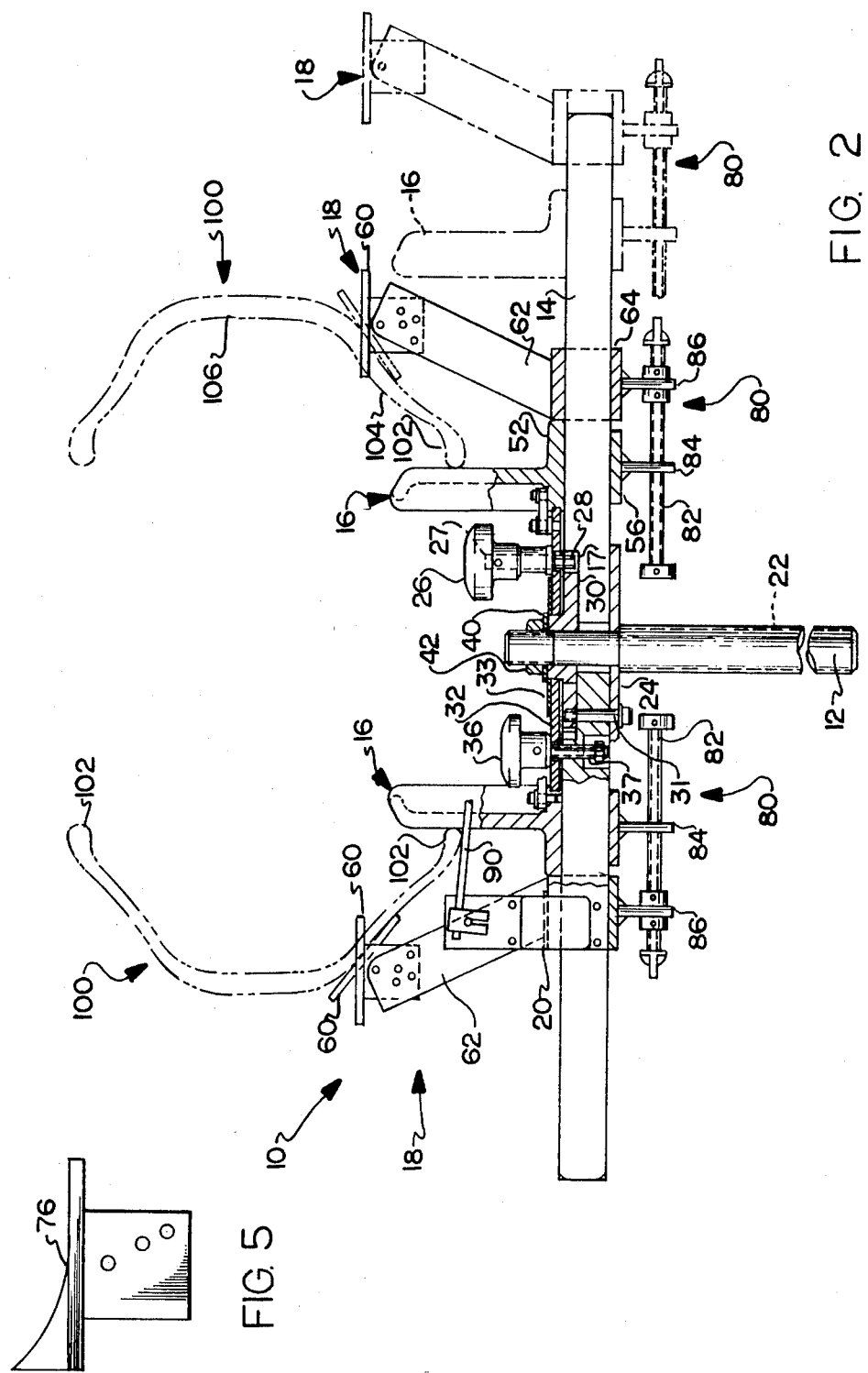

GREEN TIRE HOLDER

TECHNICAL FIELD

This invention relates to apparatus used in the manufacture of pneumatic tires for motor vehicles, and more particularly to holders for holding a green or uncured tire.

BACKGROUND ART

Pneumatic tires for motor vehicles are built the green or uncured state and are subsequently cured or vulcanized by application of heat and pressure in a mold. The mold is contained in a press, which permits the application of pressure. The green or uncured tire as built is generally toroidal in shape, symmetrical about its axis, and open at both ends. The beads are at the two ends of the green tire, the tread is in the middle, and the sidewalls lie between the tread and the respective beads, in both radial and bias ply tires.

After a green tire has been built, it is transported to the site at which the mold is located. The green tire is placed in a green tire holder where it stays until a mold becomes available. When a mold is available, an automatic loader picks up the green tire from the holder and places it in a mold.

Sometimes a green tire is stored for a while before curing, since the time between building a tire and curing is somewhat variable. Usually no particular attention is paid to the manner in which the tire is stored. The tire may simply lie on its side, for example. Since the tire is uncured, some plastic flow may take place, resulting in distortions in shape. Usually the tire is not symmetical, i.e. it is "out-of-round", after such plastic flow has taken place. If a tire of such shape is loaded into a mold and cured, it will be cured unevenly, resulting in a poor quality tire.

Various types of holders for green tires are known. Some holders have a bead centering device and support means capable of supporting the outside surface of a tire at either the sidewall or the edge of the tread. Such green tire holders are generally intended for use on one tire size only because the distance between the bead centering device and the support means is not adjustable. Since there are a number of models of automobiles with varying tire sizes on the road, a tire holder intended for only one size of tire does not properly support tires of other sizes, even when the other size differs only slightly from the size for which the holder is built. This too results in improper support for the green tire. Such a tire holder does not allow a green tire to recover from distortion in shape; in fact, it may permit further distortion with the attendant poor quality in the tire.

DISCLOSURE OF THE INVENTION

It is an object of this invention to prov a green tire holder which will permit the green tire to recover its as-built shape.

It is a further object of this invention to provide a green tire holder which will precisely position the green tire, so that the green tire will be placed in the mold precisely on center when transferred from the holder to the mold by automatic loading equipment.

A further object of this invention is to provide a green tire holder which is readily adjustable so that it may be used with a plurality of tire sizes.

A still further object of this invention is to provide a green tire holder which is especially suitable for supporting radial tires.

These and other objects will be apparent from the specification which follows and the accompanying drawings.

According to this invention, there is provided a green tire holder comprising a plurality of arms extending outwardly from a common center; a slidable bead centering shoe mounted on each of said arms; means for causing said shoes to slide equal distances simultaneously toward or away from the center, so that the shoes are always equidistant from the center; a slidable tread support mechanism mounted on each of said arms, said mechanism being more remote from the center than said shoes; and means for slidably adjusting the position of each of the tread support mechanisms independently of the positions of the centering shoes.

BRIEF DESCRIPTION OF DRAWINGS

In the drawings:

FIG. 2 is a vertical sectional view taken along line 2—2 of FIG. 1, with parts shown in elevation.

FIG. 5 is a side elevational view of an alternate form of tread support plate according to this invention.

BEST MODE FOR CARRYING OUT INVENTION

Figure 1:
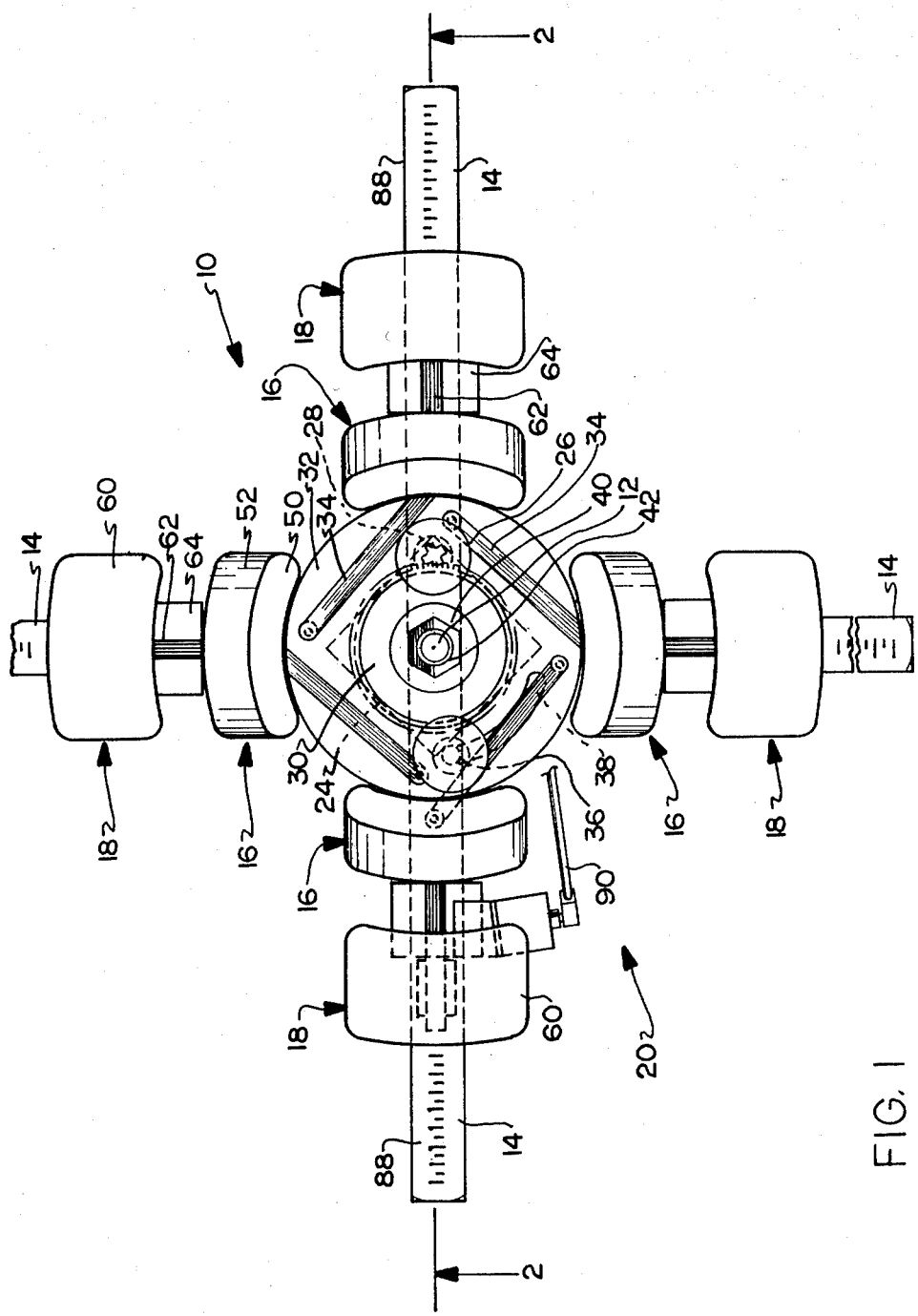
FIG. 1 is a top plan view of a tire holder according to the preferred embodiment of this invention, with the tire bead centering shoes in their innermost position.

This invention will now be described with refer to a preferred embodiment thereof, as shown in the drawings.

Referring now to FIGS. 1 and 2, 10 denotes generally a green tire holder according to a preferred embodiment of this invention. Green tire holder 10 has a vertical shaft 12 at its center for supporting the entire apparatus.

A plurality of horizontal arms 14 extend outwardly from shaft 12 and are supported thereon. Horizontal arms 14 are equiangularly spaced; thus, in the preferred embodiment shown, there are four arms 14 spaced at 90° intervals. Each of the arms 14 has a slidable tire bead centering shoe 16 mounted thereon. These shoes contact the inner edge or lip of a green tire near a bead. These shoes 16 are equidistant from the center of tire holder 10. The tire holder 10 has a mechanism, to be described subsequently in detail, for causing these shoes 16 to slide equal distances simultaneously either toward or away from the center, so that these shoes are always equidistant from the center. A portion 17 on the top side of each arm 14 near shaft 12 is cut away to receive this mechanism. Also mounted on each arm 14, at a greater distance from the center than shoe 16, is a tire tread support mechanism 18. The purpose of this mechanism, which will be described in detail subsequently, is to support the outer surface of a green tire along the tread or a sidewall thereon. As will be described subsequently, each of these tread support mechanisms is movable relative to the shoe which is mounted on the same arm. Tire tread support mechanisms 18 are mounted near the outer ends of the respective arms 14. Since both the distance between shoes 16 and the center and the distance between shoes 16 and tire tread support mechanisms 18 are adjustable, green tire holder 10 of this invention can be used to support tires of different sizes. A limit switch 20 may be mounted on one of the four arms 14 for indicating the presence of a tire in the holder 10. The four arms 14 are identical except for this limit switch 20 on one arm.

Figure 1A:
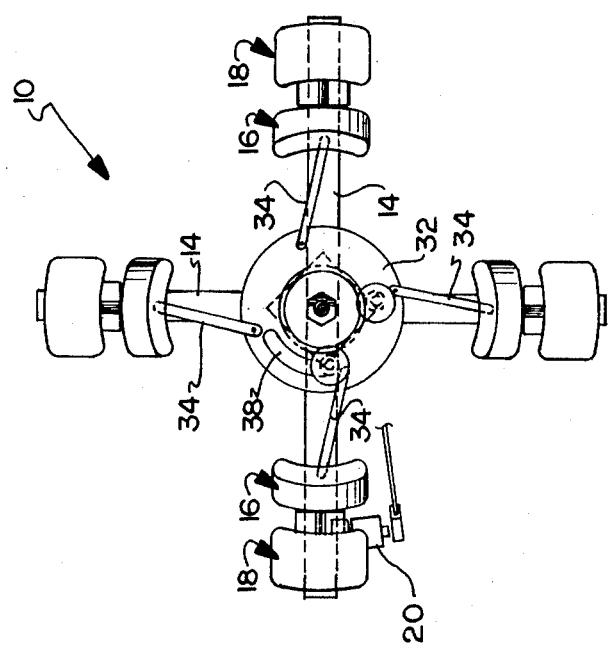
FIG. 1A is a top plan view silimar to FIG. 1, but with the tire bead centering shoes in their outermost postion.
Figure 6:
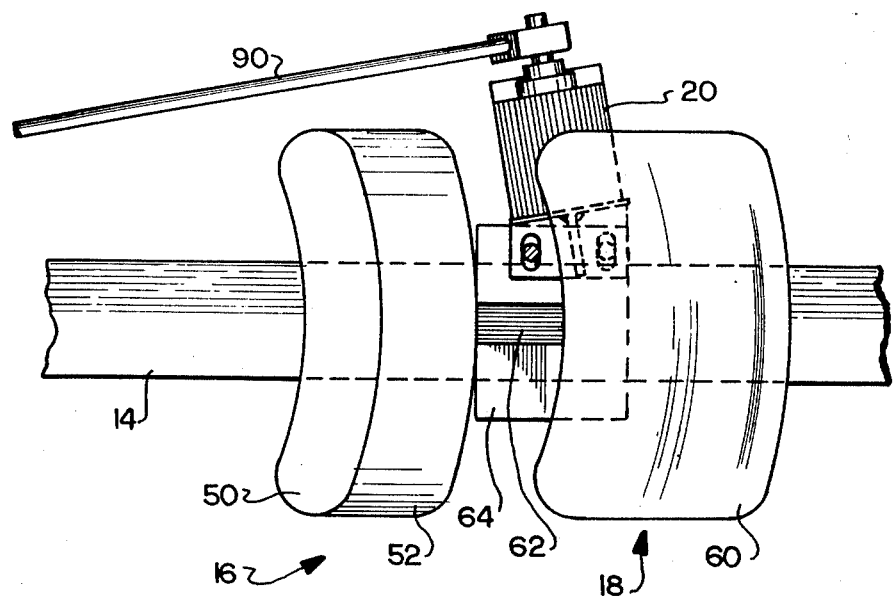
FIG. 6 is a top plan view on an enlarged scale a portion of the apparatus shown in FIG. 1, i.e. a bead support shoe, a tire tread support mechanism, and a limit switch.

FIG. 1A shows the tire bead centering shoes 16 and tire tread support mechanisms 18 in their outermost postions. In FIG. 2, phantom line positions of tire bead centering shoes 16 and tire tread support mechanisms 18 indicate the outermost positions of the respective elements, and solid lines indicate the innermost positions.

Green tire holder 10 may be supported in any desired manner; for example, holder 10 may be supported by a bracket attached to the front of a press, or it may be supported on the floor. The lower portion 22 of shaft 12 may be screw threaded as shown in FIG. 2, particularly when it is desired to support the holder 10 on a press.

A square plate 24 is bolted at its corners to the undersides of arms 14 for purposes of structural support. Plate 24 is disposed at a 45° angle with respect to the axes of arms 14.

The mechanism for moving shoes 16 either toward or away from the center includes a knob or handle 26 which may be turned manually. Knob 26 is mounted on shaft 27. Rotatably mounted on shaft 27 is a pinion gear 28, which meshes with stationary gear wheel 30, which is mounted on shaft 12. Screws 31 pass through plate 24, arms 14 and gear wheel 30 to secure plate 24 and gear wheel 30 to arms 14. Plate 32 is rotatably mounted on shaft 12 above gear wheel 30. Plate 32 has an opening for shaft 27. The shaft 27 and the plate 32 are secured together so that one can rotate plate 32 through an arc of about 90° by means of knob 26. A washer 33 between gear 30 and plate 32 provides a bearing surface for plate 32. A plurality of connecting links 34 (best seen in FIG. 1) are secured at their respective inner ends to plate 32 and at their respective outer ends to one of the shoes 16. The inner ends of links 34 are secured to plate 32 at points which are 90° apart on a circle near the circumference of gear wheel 30. Thus, rotation of pinion gear 28 and plate 32 causes shoes 16 to move either in or out, i.e. either toward or away from the center of holder 10 as shown in FIGS. 1 and 1A, respectively. This permits the operator to adjust the distance of shoes 16 from the center to accommodate tires of different bead diameters. A locking knob 36 with a screw threaded pin 37 depending therefrom is provided so that shoes 16 may be locked in a desired position. This screw threaded pin is received in an internally screw threaded socket in one of the arms 14. Plate 32 has an arcuate slot 38 to permit relative movement between the rotatable plate 32 and the stationary locking pin 36. Washers 40 and hexagonal nut 42 at the upper end of shaft 12 hold plate 32 in place.

Gear 28 may be power driven, by a double acting hydraulic cylinder or a reversible electric motor, if desired.

Each shoe 16 includes a curved vertical member 50 having a convex outer (or tire-engaging) surface, a horizontal flange 52 which rides on top of arm 14, and vertical guides (not shown) which ride along the sides of arm 14. A plate 56 bolted to these vertical guides completes the guideway assembly for shoes 16.

The tire tread support mechanism 18 includes a tiltable tread support plate 60, an upwardly extending and slightly outwardly inclined support arm 62, and a guide sleeve structure 64 which includes four plates (two horizontal and two vertical) which ride along the four surfaces of arm 14. The tread support plate 60 supports a green tire along the outer surface thereof. The support plate 60 preferably supports the green tire at or near the bottom of the tread, preventing contact of sidewall with the support plate.

Figure 3:
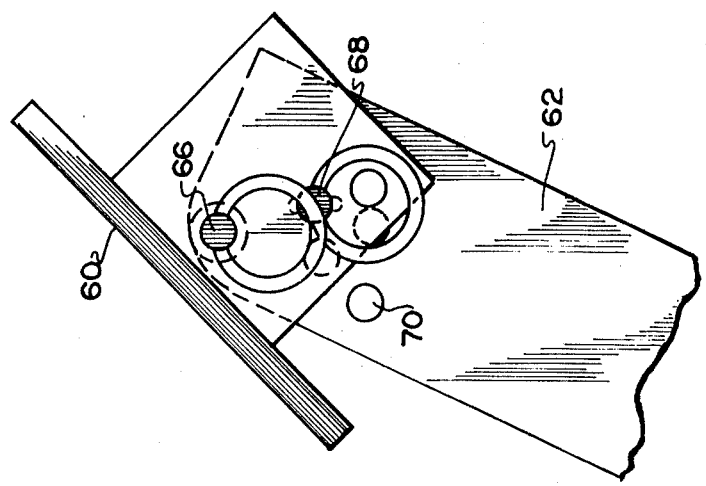
FIG. 3 is a side elevational view, on a larger scale than FIG. 2, of a tread support plate and a portion of the supporting arm therefor.
Figure 4:
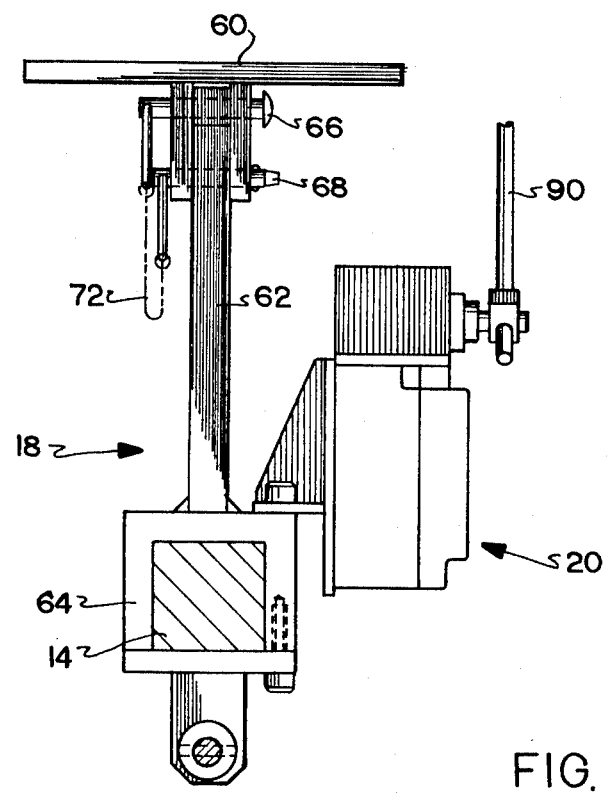
FIG. 4 is a front elevational view of a slidable tire tread support mechanism according to this invention.

The angle of inclination of plate 60 is adjustable, as best seen in FIGS. 2, 3 and 4. The user of the tire holder can adjust the angle of plate 60 to whatever angle gives the best support to the tire. This angle will vary, depending on the size of the tire. In a preferred adjusting arrangement, the angle between plate 60 and the horizontal may be varied from 0° to 60° in 15° intervals. To this end, there is provided a pivot pin 66 which engages both the support arms 62 and a mounting bracket on the underside of plate 60. A locking pin 68, which extends through a hole in the mounting bracket and one of a plurality of holes 70 in support arm 62, locks the plate 60 in the desired position. The holes 70 are arranged in such pattern as to provide the aforementioned 15° intervals between successive positions of the plate 60. Locking pin 68 may be secured to the tire bead support mechanism 18 by means of a chain 72. Plate 60 is preferably flat as shown. The inner edge of plate 60 is preferably concave as shown so as to afford support to the greatest area of the tread edge without contacting the sidewall.

Other means for adjusting the angle of plate 60 may be provided instead of the means shown. For example, one may provide a set screw on arm 62 which extends through an arcuate slot on the underside of plate 60. The set screw may be tightened in any position, so that a continuous adjustment of the angle of plate 60 with the horizontal is possible.

FIG. 5 shows a curved tread support plate 76 according to an alternstive embodiment of this invention. The curved plate 76 may be substituted for the flat plate 60, the remainder of the device being as already described. The contour of curved plate 76 may be custom designed so that the plate contour conforms exactly to the contour of the tire tread base. This provides a secondary means for centering the tire in the holder 10. A contoured plate 76 is especially valuable in the manufacture of racing car tires and other high performance tires.

Referring again to FIG. 2, an adjusting mechanism 80 is provided on each arm 14 for adjusting the distance between shoe 16 and tire tread support mechanism 18. This adjusting mechanism 80 includes an adjusting screw 82 and screw threaded hangers 84 and 86, which depend from the undersides of the respective guide mechanisms of shoes 16 and tire tread support mechanism 18, respectively. Hangers 84 and 86 constitute first and second support members secured to centering shoe 16 and to tread support mechanism, respectively, and adjusting screw 82 constitutes means for varying the distance between these support members. Movement of shoes 16 either toward or away from the center causes the tread support mechanisms 18 to move toward or away from the center by the same amount, if no adjustment with screw 82 is made. This may be seen by comparing FIGS. 1 and 1A.

The operator may set the position of the bead centering shoes 16 in accordance with the nominal bead diameter of the tire, and set the tread support mechanisms 18 (which must be adjusted individually) in accordance with the sidewall width. If the actual bead diameter of a given tire varies slightly from the nominal diameter, the operator may move the bead centering shoes either in or out (i.e., either toward or away from the center) as required, and the tread support mechanisms move in or out with the bead centering shoes without a separate adjustment. Slight variations in sidewall width likewise do not require any separate adjustment of the tread support means 18 when flat plates 60 are used, because the tread shoulder can touch any portion of plate 60 and receive proper support. Also, holder 10 can be used to hold tires having different bead diameters but the same (or nearly the same) sidewall width without adjustment of the tread support mechanism.

The distance between the tire tread support mechanism 18 and the centering shoe 16 on any given arm 14 may be changed by use of the adjusting screw 82. This adjustment is required when successive tires placed in holder 10 have different sidewall widths.

Ruler markings 88 may be provided along the length of each arm 14 so that one can manually set the position of the bead centering shoes 16 in accordance with the bead diameter of the tire, and may set all the tire tread support mechanisms 18 to the same distance from the center in accordance with the sidewall width of the tire.

Other adjusting means beside that shown can be used for fixing the positions of the tire tread support mechanism 18. For example, each mechanism may be held in place by means of a pin extending through pin holes in arm 18 and in the guideway portion of the tire tread support mechanism 18. A plurality of evenly spaced holes in the horizontal arm 14 are required. Alternatively, an adjustable screw mechanism similar to that shown, but with one of the hangers mounted directly on arm 14 rather than on shoes 16, may be provided. In either of these arrangements the position of the tire tread support mechanism 18 would remain fixed despite movements of shoe 16 either toward or away from the center.

Adjustment mechanisms in which the tread support means 18 move in or out with the bead centering shoes 16, such as the adjusting mechanism 80 shown and described herein, are generally preferable because they require fewer adjustments of the tread supporting shoes 18.

Holder 10 may be provided with a limit switch 20, mounted on one arm 14. Limit switch 20 may be conventional and may include an actuating arm 90 which is pivotally mounted on the limit switch housing. When a green tire is inserted in tire holder 10, the actuating arm 90 is moved downwardly, causing the limit switch 20 to detect the presence of the green tire and to generate an output signal accordingly. This output signal may be used to actuate circuitry on a mold press allowing the automatic loader to pick up the tire for loading into the mold. Any suitable power supply, e.g. 110 volts AC, may be provided for limit switch 20.

Referring again to FIG. 2, a green tire 100 (shown in phantom lines) may be inserted into holder 10 in approximately the position shown. The green tire 100 shown is a radial tire which includes beads 102, sidewalls 104, and tread 106. Tire 100 is inserted into holder 10 so that the axis or centerline of the tire is vertical, with the lower bead 102 engaging shoes 16 and the upper bead 102 free, and with each of the support plates 60 engaging the tire along the outer surface thereof, either at the base of tread 106, or along sidewall 104 or just below tread 106. The angle of support plate 60 to the horizontal may be adjusted so that its slope conforms to that portion of the tire 100 which the plate engages.

Tire holder 10 is preferably of all metal construction. Arms 14, bead centering shoes 16, tread support plates 60 and support arms 62 and other plates not subject to hard wear, may be made of aluminum. Parts which may be subjected to hard wear, such as pinion gear 28, gear wheel 30, shaft 12 and screws are preferably made of steel. Washers may be made of steel or brass as desired.

The operation of the green tire holder 10 of this invention will now be described.

First, the position of centering shoes 16 is adjusted for the bead diameter of the tire. The bead diameter of the green tire is very close to that of the finished tire. After the centering shoes 16 have been placed and locked in the proper position, positions of the tire tread support mechanisms 18 are adjusted manually by means of adjusting mechanism 80 so that each of the tire tread support mechanisms 18 is the same distance from the center and is at the right distance from shoe 16 to give proper support to the tire tread. The tread diameter in a green tire is substantially less than that in the finished tire, but there is an approximate correspondence in the two measurements.

Next, a green tire is placed upright in the tire holder 10 as shown by the phantom lines in FIG. 2. As shown in FIG. 2., tire 100 is placed so that the lower bead 102 contacts the vertical members 50 centering shoe 16 above horizontal flanges 52, the upper bead 102 is free, and the outer surface of the tire 100 is supported by tread support plates 16 at the base of the tread, which is usually preferred, or along the sidewall 104 near the tread if desired. The bottom bead 102 floats, i.e. it does not support any weight of the tire and it is free to drop along vertical members 50 as the tire relaxes. Some fine tuning of the position of bead centering shoes 16, tire tread support mechanisms 18 and/or the angle of support plates 60 may be necessary when the tire 100 is actually placed in the holder 10. The tread support plates 60 give the needed support to the tire tread 106, which is the heaviest portion of the green tire. This allows relaxing of the lower sidewall of a sagging green tire 100 while it is waiting to be loaded into a mold. The tire recovers its as-built shape during this relaxation if its shape has become distorted.

Third, when a mold becomes available, the green tire is lifted from the tire holder 10 and transported to the mold. This may be done by a conventional automatic loader. The automatic loader may pick up the tire either by the top bead 102 or the lower tread edge; both types of automatic loaders are known. Because the green tire is precisely centered in tire holder 10, it will also be precisely centered in the mold, depending on the accuracy of the loader mechanism. This results in a more uniform curing and a better tire.

One size of tire holder 10 is capable of accommodating green tires for all automobile sizes and for light truck sizes as well. For example, the green tire holder shown may support tires having bead diameters (or center diameters) ranging from about 12 to about 19 inches, and outside diameters ranging from about 20.3 inches up to about 32.3 inches. This embraces the entire range of automobile tires, and some light truck tires as well. The tire holder 10 may be built in larger sizes as needed for the manufacture of larger tires, such as those used on trucks and off-the-road machinery.

The tire holder of this invention is intended primarily for use with radial tires. It can also be used with bias ply tires. The tire holder allows the green tire to recover its original as-built shape prior to loading into the mold.

The tire holder of this invention has several advantages over tire holders in present use, as is apparent from the specification. First, the tire holder of this invention centers a tire accurately, so that the tire will be correctly centered when it goes into the mold, resulting in a better tire. Secondly, the tire holder of this invention supports the green tire at several points just below the tread, allowing the lower bead and sidewall to relax to a normal undistorted position. This allows for better loading of the tire when picked up by either the top bead or the lower tread edge. This also results in better quality tires. Also, the adjustability features of the green tire holder herein make it possible to use a single green tire holder for producing all sizes of automobile tires, and makes it possible to produce tires of any size with tire holders of only a few different sizes.

While in accordance with the patent statutes, a preferred embodiment and best mode has been presented, the scope of the invention is not limited thereto, but rather is measured by the scope of the attached claims.

What is claimed is:

1. A green tire holder comprising:
   (a) a plurality of arms extending outwardly from a common center;
   (b) a bead centering shoe slidably mounted on each of said arms and having a convex tire-engaging surface thereon;
   (c) movement means linking each of said arms together for causing said shoes to slide equal distances simultaneously toward or away from said center, so that said shoes are always equidistant from said center;
   (d) a tread support mechanism slidably mounted on each of said arms for effecting pressure contact support over a relatively large area of the outer surface of a green tire along a tread or sidewall thereof, said mechanism being more remote from the center than its respective shoe, said mechanism including a tiltable support plate for contacting said tire along said tread or sidewall surface thereof; and
   (e) adjustable means on each arm located between and connecting the tread support mechanism and its respective shoe for slidably adjusting the position of each of said tread support mechanisms relative to the shoe which is mounted on the same arm, said adjustable means causing said tread support mechanism and its respective shoe to move together as a unit upon actuation of the movement means.

2. A green tire holder according to claim 1 including a centrally located support shaft for supporting said arms.

3. A green tire holder according to claim 1 in which said adjustable means includes an adjusting screw supported by hangers attached respectively to said shoe and said tread support mechanism for varying the distance between said tread support mechanism and said shoe, said hangers engaging said screw so that said tread support members move as the shoes are moved when no adjustment with said screw is made.

4. A green tire holder according to claim 1 in which said tread support mechanism further includes a support arm for supporting said tiltable support plate.

5. A green tire holder according to claim 1 in which said arms extend horizontally and said support plate is tiltable through an angle of 0° to an angle of 60° to the horizontal.

6. A green tire holder according to claim 1 in which each of said bead centering shoes and each of said tread support mechanisms includes guide means for guiding sliding movement of said shoe or said tread support mechanism along the arm on which said shoe or said tread support mechanism is mounted.

7. A green tire holder according to claim 1 in which said convex tire-engaging surface is an outwardly directed essentially vertical surface.

8. A green tire holder according to claim 1 in which said movement means includes a vertical shaft at said center, a plate rotatably mounted on said shaft, means for rotating said plate, and a plurality of connecting links, each of which is secured to said plate and to one of said shoes.

* * * * *